United States Patent [19]

Ogle et al.

[11] 4,405,199

[45] Sep. 20, 1983

[54] METHOD FOR ENHANCING SIGNALS TRANSMITTED OVER OPTICAL FIBERS

[75] Inventors: B. Lyons, Whiterock, N. Mex.

[73] Assignee: The United States of America as represented by the U.S. Department of Energy, Washington, D.C.

[21] Appl. No.: 233,532

[22] Filed: Feb. 11, 1981

[51] Int. Cl.³ .............................................. G02B 5/14
[52] U.S. Cl. ................................ 350/96.19; 356/228; 250/227
[58] Field of Search .................... 350/96.19, 96.15; 356/228; 250/227; 455/608

[56] References Cited

U.S. PATENT DOCUMENTS

| | | | |
|---|---|---|---|
| 3,600,594 | 8/1971 | Moore | 250/227 |
| 3,684,346 | 8/1972 | Lang | 350/96 B |
| 3,892,468 | 7/1975 | Duguay | 350/96 B |
| 3,980,391 | 9/1976 | Stewart | 350/96 C |
| 3,984,332 | 10/1976 | Nelson et al. | 250/368 |
| 3,991,318 | 11/1976 | Duguay | 250/578 |
| 4,128,759 | 12/1978 | Hunt et al. | 250/199 |
| 4,156,809 | 5/1979 | Phillips | 250/199 |
| 4,164,373 | 8/1979 | Schuss et al. | 356/316 |

OTHER PUBLICATIONS

Ayoama et al., "Law-loss Optical Demultiplexer for WPM Systems" *Applied Optics* vol. 18, #16 8/15/79.
Kobayshi et al., "Micro-Optic Grating Multiplexers for Fiber Optic Commun." Topical Meeting on Fiber Commun., IEEE 3/7/79.
Nosu et al., "Multireflection Optical Multi Demultiplexer Using Interference Filters" Electronics Letters vol. 15, #14 7/5/79.
Kobayashi et al., "Microoptic Grating Multiplexers" IEEE Journal Quantum Elec. vol. QE-16, #1 1/80.
Fujii et al., "Optical Demultiplexer" IEEE Journal of Quantum Electronics vol. QE-16, #2 2/1980.

*Primary Examiner*—David K. Moore
*Attorney, Agent, or Firm*—John A. Koch; Richard G. Besha

[57] ABSTRACT

A method for spectral equalization of high frequency spectrally broadband signals transmitted through an optical fiber. The broadband signal input is first dispersed by a grating. Narrow spectral components are collected into an array of equalizing fibers. The fibers serve as optical delay lines compensating for material dispersion of each spectral component during transmission. The relative lengths of the individual equalizing fibers are selected to compensate for such prior dispersion. The output of the equalizing fibers couple the spectrally equalized light onto a suitable detector for subsequent electronic processing of the enhanced broadband signal.

2 Claims, 3 Drawing Figures

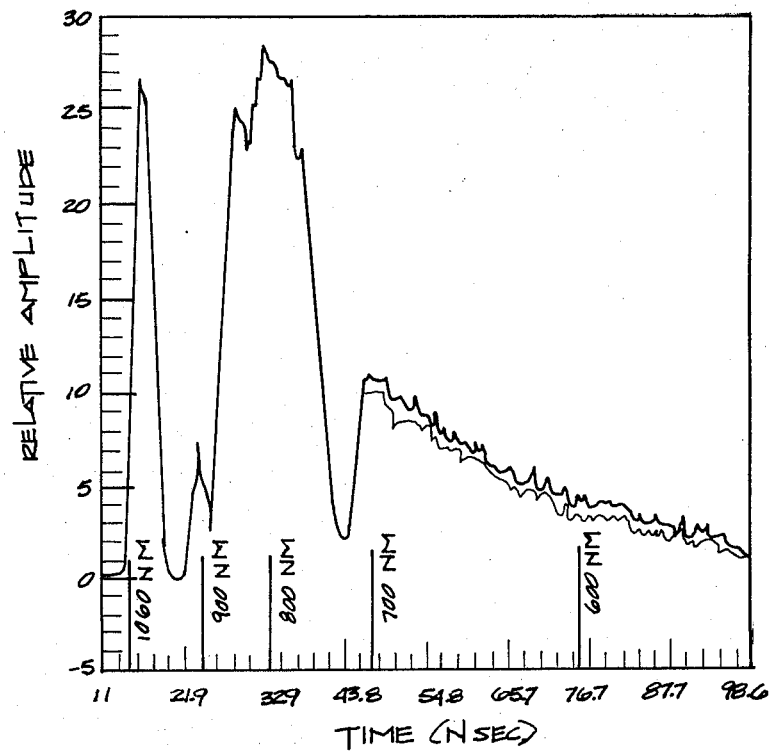
FIG 1
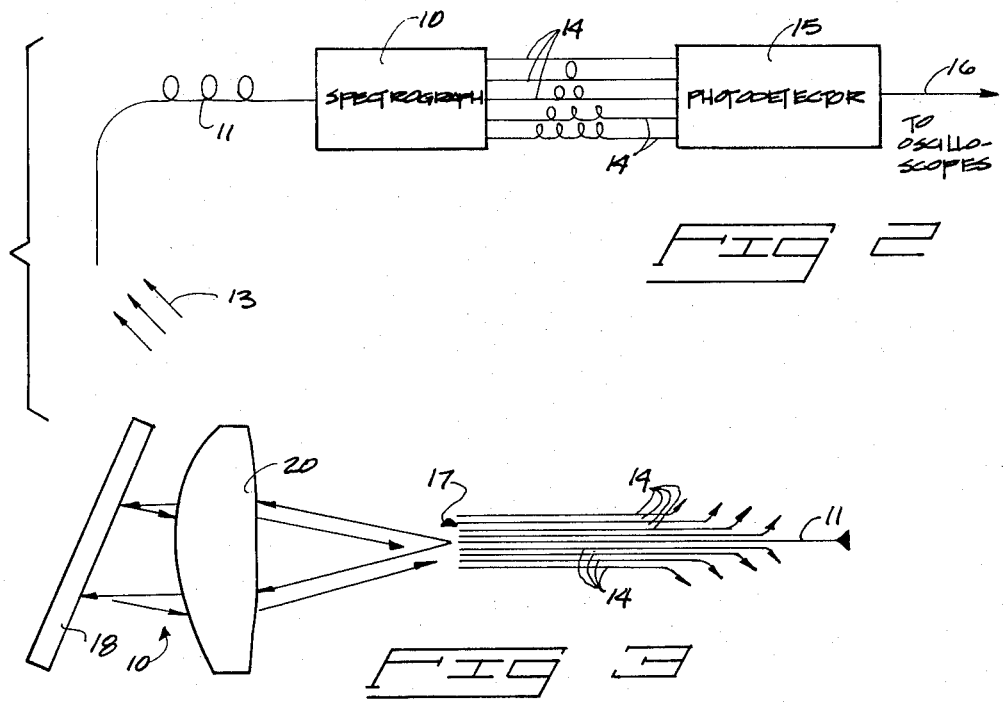
FIG 2
FIG 3

METHOD FOR ENHANCING SIGNALS TRANSMITTED OVER OPTICAL FIBERS

BACKGROUND OF THE INVENTION

This invention relates to a method for enhancing signals transmitted over fiber optic wave-guides, generally known as optical fibers. It specifically is directed to enhancement of short, spectrally broadband optic pulses transmitted through an optical fiber having substantial length.

The signal enhancement technique which is the subject of this disclosure arose from developments relating to optical measurements in high frequency plasma diagnostics. It provides prompt diagnostic signals derived from fast radiation pulses such as produced in connection with the detonation of nuclear explosions. In such applications, a radiation-to-light converter could be an optical fiber or a red fluor placed in the plasma radiation beam as a Cerenkov transducer or fluor transducer, respectively. U.S. Pat. No. 3,984,322 to Melvin A. Nelson, Terence J. Davies and John R. Morton, III, assignors to the assignee of the present application, is directed to a radiation detection system utilizing optical fibers as Cerenkov transducers and U.S. Pat. application Ser. No. 949,163, filed Oct. 6, 1978 in the names of Larry A. Franks, Stephen S. Lutz and Peter B. Lyons, also assignors to the assignee of the present application is directed to a radiation detection system utilizing optical fibers in combination with fluor transducers. The signal source might also be a Light Emitting Diode (LED) driven by an electrical signal derived from the radiation. The signal enhancement technique according to the invention is also applicable to the communications industry. It would enable relatively inexpensive spectrally broadband Light Emitting Diodes to be used in transmitters for long high-bandwidth optical fiber links in place of relatively more expensive lasers.

Broadband signals transmitted through optical fibers are degraded by material dispersion. Conventional methods used to reconstruct such signals and preserve their high frequency components involve initial selection of an appropriate limited bandwidth by use of a narrow band filter or monochromator. The filtered signal transmitted through the optical fiber is then detected by use of a high speed detector. The resulting electrical signal is subsequently processed. This approach has two disadvantages: first, narrow band filters have "wings" that degrade the system frequency response and, second, most of the available signal is undetected.

The present disclosure replaces the narrow band filter with a fiber optic wavelength multiplexer device. The broadband signal input is initially dispersed and narrow spectral components are collected into an array of fibers. Each fiber is used as an optical delay line to compensate for the material dispersion of its spectral component during the original signal transmission. These equalizing fibers, each cut to an appropriate length, couple the spectrally equalized light onto a detector for further processing.

This technique increases signal magnitude by utilizing more of the available broadband spectrum than is possible when using narrow band filters. It also improves frequency response by eliminating the common "wing" contributions of such filters.

BRIEF SUMMARY OF THE INVENTION

It is a first object of this invention to provide a method which compensates for material dispersion of broadband signals on short pulses transmitted through substantial lengths of optical fibers. It is a further object of this invention to provide such compensation by optical fiber transmission techniques.

These and further objects are accomplished by dispersing the received broadband signal into a plurality of spectral components. The spectral components are directed to individual optical fibers within an array of equalizing fibers. Each fiber within the array has a length selected to compensate for prior dispersion of the spectral component directed to it. The output of the array illuminates a detector, which thereby receives the sum of the broadband signal is superimposed on the various spectral components. The method brings these essentially identical signals carried by each spectral component back into synchronism for further processing.

BRIEF DESCRIPTION OF THE DRAWINGS

FIG. 1 is a plot of a radiation spectrum after fiber optic transmission;

FIG. 2 is a schematic flow diagram of the signal amplification technique; and

FIG. 3 is an optical schematic diagram of an apparatus for practicing the invention.

DETAILED DESCRIPTION

Fiber optic transmissions utilizing broadband transducers and long lengths of fibers today require use of a narrow band filter to realize reception of high bandwidth signals. The material dispersion in the fiber will otherwise degrade the signal. The use of narrow band filters eliminates a large amount of potentially useful light. The present disclosure provides signal amplification by use of wavelength multiplexing techniques.

The present technique is generally applicable to compensating for material dispersion of any fast signals transmitted through long lengths of optical fibers. The most pressing need for such a technique is in applications of fiber optic measuring systems which ideally would have a one-GHz/km bandwidth. This requires an overall system time response of 350 psec, which approaches the upper limit of state of the art, 18-mm photocathode, micro-channel plate detectors today. To assure that fiber dispersion does not degrade the time response by more than 10% at 800 nm, with a typical material dispersion for an optical fiber of 115 psec-$nm^{-1}$-$km^{-1}$, the spectral bite must be limited to less than 1.5 nm for 1 kilometer of fiber. This considerably decreases the available signal intensity. The present wavelength multiplexer technique provides a solution toward increasing the signal by equalizing the results of such dispersion.

As an illustration of the principals underlying the invention, a delta function (50 psec) of white light injected into a kilometer of optical fiber will normally be spectrally dispersed by the fiber into a pulse over 100 nsec long, characterized by the spectral attenuation of the fiber. A typical resulting pulse pattern is illustrated in FIG. 1. FIG. 1 shows a plot of relative amplitude versus time for a broadband Cerenkov delta function radiation spectrum following transmission through 1 kilometer of fiber. Were the signal shown in FIG. 1 measured through a series of narrow band filters having a Full Width Half Max (FWHM) of 1 nm, the result would be a series of pulses, each representative of the fiber frequency response for the corresponding wavelength. These would, of course, arrive at the end of the transmitting fiber at different relative arrival times.

The method according to the invention compensates for the material dispersion in the fiber so that all spectral components will arrive at the recording means at the same time so that there is little consequent loss of frequency response of light. To achieve this, a high efficiency spectrograph is positioned to receive the transmitted broadband spectrum from the exit end of the fiber. The spectrograph optically disperses the signal into a plurality of spectral components. The spatially separated wavelengths are then collected by an array of equalizing fibers. This array is composed of individual fibers which have relative lengths selected to compensate for prior dispersion of the respective spectral components of the signal resulting from transmission through the transmission fiber. All signals in the equalizing filters are thereby brought into coincidence with one another.

The fibers within the array are arranged to illuminate a common photodetector. The increased signal from the photodetector will be a direct function of the spectrometer efficiency and the number of fibers used in the array.

FIGS. 2 and 3 schematically illustrate the components used in the application of this technique. Spectrograph 10 receives a short, spectrally broadband optical pulse transmitted to it through a long length of optical fiber illustrated at 11. As applied specifically to high frequency plasma diagnostics, the original optical signal might be a Cerenkov pulse produced within fiber 11 by subjecting the fiber to a beam of charged particles, shown at 13 in the manner described in the above-cited patent to Nelson, et al. As another example, the signal could be the output of a radiation-to-light converter.

The output of the spectrograph 10 is directed through a plurality of equalizing fibers 14 of differing lengths leading between spectograph 10 and a conventional photodetector 15. The output of photodetector 15, shown at 16, is fed into an oscilloscope or to other conventional electronic equipment for processing the enhanced signals applied to it.

The equalizing fibers 14 are arranged in a linear array, with a first end 17 (FIG. 3) located across a common plane coincident to the focal plane of the spectrograph 10. The illustrated spectrograph 10 comprises a grating 18 and associated lens 20 in the Littrow mounting. The grating 18 and lens 20 are illustrated in FIG. 3 as receiving a signal from a center transmission fiber 11 arranged between a series of progressively longer equalizing fibers 14 shown alternately in FIG. 3.

In order for this technique to be of practical use, the spectrograph 10 must be designed for efficiency. As shown in FIG. 3, the fiber optic input signal from transmission fiber 11 is collimated by lens 20. The parallel light is dispersed by a high efficiency grating (above 80% in 1st order), then is collected and focused on the linear array of equalizing fibers 14 by the same lens.

The most general form of the "grating" equation is $$m\lambda = d(\sin\theta + \sin\beta)$$

where
m = order of diffraction
λ = wavelength
d = groove spacing
θ = angle of incident measured from the normal
β = angle of diffraction, also measured from the grating normal (θ and β will have the same sign on the same side of the normal.)

For lthe design shown in FIG. 3, the angles θ and β will be essentially equal and the grating is said to be mounted in "autocollimation" (Littrow). Echellettes, which are gratings blazed for use in low orders (1 or 2) have few diffracting orders and high efficiency. For spectral conditions where the groove spacing is greater than one half the wavelength and less than one and one half times the wavelength, an Echellette allows only the 0 and +1 orders to exist in autocollimation. Echelletts in Littrow have typical efficiencies of 80% for the +1 order in the near infrared frequency ranges.

The gratings used experimentally in the development of the invention had the following specifications:

| | |
|---|---|
| Blaze wavelength | 7500Å |
| Blaze angle | 26°45' |
| Grooves per mm | 1200 |
| Relative efficiency at 7500Å | 80% |
| Angular dispersion (in Littrow) | 7.45Å/mr at 7500Å |
| Size (mm) | 50 × 50 × 10 |

The linear dispersion of the spectrograph 10 is dependent on the focal length of the collimating lens 20. In the above-described experiments, an A f/1.6 80-mm AR coated achromatic lens was used. The combination of the above grating and lens produced a linear dispersion of 93.1 Angstroms/mm. At this dispersion, the theoretical spectral bandwidth that the combination will collect, using various fiber optic core diameters in the equalizing fibers 14 are as follows:

| Fiber Core Diameter (μ) | FWHM (nm) |
|---|---|
| 62 | 0.58 |
| 80 | 0.75 |
| 90 | 0.84 |
| 125 | 1.16 |
| 200 | 1.86 |
| 400 | 3.73 |
| 600 | 5.59 |
| 1000 | 9.31 |

The transmission fiber 11 should be selected for maximum transmission efficiency of the high frequency signals. The core diameter of the best presently available high frequency fiber is 62.5μ with an outside diameter of 125μ. However, the equalizing fibers 14 can be selected from fibers having substantially larger diameters, thus relaxing the technical requirements on the optics. As an example, fibers having a 90μ core and outside diameter of 170μ were used for the equalizing fibers in the specific experimental applications. These fibers, arranged in a linear array, provided a difference in center wavelength between neighboring fibers of 1.59 nm.

The relative lengths of the equalizing fibers 14 for enhancement of a portion of the signal illustrated in FIG. 1 can be determined by arbitrarily selecting the first of ten fibers to receive dispersed light centered at 800 nm. The center wavelengths for the remaining equalizing fibers 14 will be progressively increased by 1.59 nm per fiber. Published reports show that relative arrival times for the signal transmitted through fiber 11 can be determined by the equation:

$$T = 8.63 \times 10^8 \left[ \frac{1}{\frac{2.543}{\lambda 1}} - \frac{1}{\frac{2.543}{\lambda 2}} \right] l$$

where T is in nsec, l in km, and λ in nm.

The relative fiber lengths (ΔD) for the successive equalizing fibers 14 can be computed by multiplying the mathematically derived arrival times (T) for the center frequency of the spectral components directed to each equalizing fiber 14 by the speed of light in the fibers (20 cm/nsec). The following table lists the arrival times and relative lengths of an array of equalizing fibers received from transmission fibers 11 having lengths of 0.9 km and 1.0 km, respectively. The table is based upon an assumed index of refraction of 1.5 for the equalizing fibers 14.

|         | l = 0.9 km |         | l = 1.0 km |         |
|---------|------------|---------|------------|---------|
| λ (nm)  | T (nsec)   | ΔD (cm) | T (nsec)   | ΔD (cm) |
| 800.0   | 0          | 0       | 0          | 0       |
| 801.6   | 0.162      | 3.24    | 0.180      | 3.60    |
| 803.2   | 0.323      | 6.46    | 0.359      | 7.18    |
| 804.8   | 0.483      | 9.66    | 0.537      | 10.73   |
| 806.4   | 0.642      | 12.83   | 0.713      | 14.26   |
| 808.0   | 0.799      | 15.99   | 0.888      | 17.76   |
| 809.5   | 0.956      | 19.12   | 1.062      | 21.24   |
| 811.1   | 1.111      | 22.23   | 1.235      | 24.70   |
| 812.7   | 1.266      | 25.31   | 1.406      | 28.13   |
| 814.3   | 1.419      | 28.38   | 1.577      | 31.53   |

The figures in the above table show that practical lengths of equalizing fibers 14 can be used to accomplish the results desired by this technique.

Efficiency considerations relating to this technique relate primarily to losses caused by the grating inefficiency and Fresnel losses at each glass-air interface. For an 80% efficiency grating (0.97 db loss) and 6 glass surfaces (2 fiber surfaces and 4 surfaces for the lens 20) at a 4% loss (1.18 dB) per surface, the best efficiency is 63% (2.03 dB loss). The literature quotes total losses of 2 to 3 dB.

Conventional systems using a 2 nm FWHM filter at 800 nm have a 50% transmission efficiency. The number of equalizing fibers necessary to match this power output, assuming losses of 3 dB, is 2.38. Therefore, a system using 10 equalizing fibers 14 would increase the detector signal by a factor of about four in comparison to use of narrow band filters. This assumes a reasonably flat input spectral distribution near 800 nm, as shown in FIG. 1.

While specifically describing the application of this technique to high frequency plasma diagnostics, it is to be understood that the multiplexing technique can be applied to any fast carrier pulse for a spectrally broadband signal transmitted through a long optical fiber. It is also possible to produce a multichannel system by placing one linear optical fiber array on top of another to receive spectral components at the output of the spectrograph 10.

The choise of operational components in the use of this technique is not to be limited to any specific devices, and components having comparable functions can be substituted for those specifically described. For instance, another grating system could be used in spectrograph 10 in place of the one illustrated or spectrograph 10 might utilize a suitable prism system rather than a grating in certain applications.

What we claim is:

1. A method of enhancing a short, spectrally broadband signal transmitted through an optical fiber having substantial length, said method comprising the following steps:

inserting the signal into a spectrograph;

collecting a plurality of spectral components of the signal by directing the output of the spectrograph into an array of equalizing fibers whose individual fibers have relative lengths selected to compensate for prior material dispersion of the respective spectral components of the signal during transmission;

and illuminating a photodetector by the resulting output signals from the array of fibers.

2. A method of enhancing an incoming optical fiber signal by the following steps:

dispersing a received broadband signal into a plurality of narrow spectral components;

directing each narrow spectral component to a first end of an individual equalizing fiber within an array in which the length of individual equalizing fibers is selected to compensate for prior dispersion of the spectral component directed thereto;

and illuminating a detector by the resulting signals at the remaining ends of the equalizing fibers.

* * * * *

UNITED STATES PATENT OFFICE
CERTIFICATE OF CORRECTION

Patent No. 4,405,199     Dated September 20, 1983

Inventor(s) James W. Ogle et al

It is certified that error appears in the above-identified patent and that said Letters Patent are hereby corrected as shown below:

Title: change to read -- "A Method For Enhancing Signals Transmitted Over Optical Fibers --.

Inventors: change to read -- James W. Ogle, Goleta, Calif. and Peter B. Lyons, Whiterock, N. Mex.

Col. 4, line 7, change "1the" to read -- the --.

Col. 5, line 7, change "1 in km" to read -- $\ell$ in km --.

Col. 5, line 20, change "1" (each occurrence) to read -- $\ell$ --.

Col. 6, line 14, change "choise" to read -- choice --.

Signed and Sealed this

Seventeenth Day of July 1984

[SEAL]

Attest:

GERALD J. MOSSINGHOFF

Attesting Officer

Commissioner of Patents and Trademarks